United States Patent [19]
Spear

[11] Patent Number: 5,642,354
[45] Date of Patent: Jun. 24, 1997

[54] ENHANCED ACCESS BURST IN A WIRELESS COMMUNICATION SYSTEM

[75] Inventor: Stephen Lee Spear, Skokie, Ill.

[73] Assignee: Motorola, Inc., Schaumburg, Ill.

[21] Appl. No.: 522,771

[22] Filed: Sep. 1, 1995

[51] Int. Cl.[6] .................. H04J 3/16; H04B 7/212
[52] U.S. Cl. .................. 370/329; 370/348; 370/443; 370/458; 370/915
[58] Field of Search ................... 370/95.3, 95.1, 370/85.7, 32, 80, 59, 329, 347, 348, 442, 443, 458, 913, 915; 379/59

[56] References Cited

U.S. PATENT DOCUMENTS 5,420,864  5/1995  Dahlin et al. .................. 370/95.3
5,502,721  3/1996  Pohjakallio .................. 370/60.1

Primary Examiner—Douglas W. Olms
Assistant Examiner—Matthew C. Phillips
Attorney, Agent, or Firm—Kevin A. Buford

[57] ABSTRACT

A method for improved data communications in a wireless system is described. An enhanced access burst is provided having an additional logical information field, or alternately using one of a set of possible synch sequences indicative of supplementary information. Upon receipt of a system parameter indicating an enhanced access burst capability, the communication unit sends an appropriate enhanced access burst with the increased information. A reduction in system messaging is thus achieved, e.g., by avoiding the need to send the supplemental information via subsequent bursts.

12 Claims, 2 Drawing Sheets

— PRIOR ART —

ENHANCED ACCESS BURST IN A WIRELESS COMMUNICATION SYSTEM

FIELD OF THE INVENTION

The present invention relates to communications and more particularly an improved method for communicating data in a wireless communications system.

BACKGROUND

In recent years there has seen a tremendous increase in the demand for wireless networks capable of handling data communications. In order to accommodate this increased demand there is a constant search to find improved, more efficient approaches to communicating subscriber data. One such approach has been to limit the size and content of access requests, sometimes referred to as access bursts. This has the beneficial result of allowing more users to obtain initial access to the channels and, where like some voice cellular systems a dedicated access channel is provided, it permits an operator to keep the number of access channels to a minimum by transferring subscribers obtaining access to a traffic channel.

In the case of non-voice data communications, which are more bursty in nature than traditional voice communications, it is more common to find access and traffic communications taking place on the same channels. It is even more desirable in this case, in order to allow for as many subscribers to get access to this same channel, to keep access burst sizes to a minimum. Consequently, many wireless systems, such as the GSM (Global System for Mobiles) and the proposed GPRS (GSM Packet Radio Service) cellular services, limit their standard access bursts to subscriber identifying information, and essential overhead such as a synch (synchronization) sequence and guard bits. This is also partly because most standard access bursts need the synch sequence and guard bits to be much longer than in traffic bursts. This result occurs because on initial access subscriber timing is not fully synchronized, so a longer training (synch) sequence is needed by the receiving unit. In the case of TDMA (time division multiple access) communications, such as in GSM, the increased guard bits are also needed around the access burst to insure it does not interfere with communications in adjacent time slots.

A major disadvantage with this reliance on standard access bursts is that short data messages cannot be sent through traditional access bursts, and most non-voice communications have a significant amount of such messaging (e.g., ACK (acknowledgment) and NACK (non-acknowledgment) signals). As a result, a common approach in wireless systems has been to require the transmission of an access burst to obtain a channel or subchannel allocation, and then subsequently sending the information in a second burst. Thus three data transfers are required (e.g., two uplink and one downlink allocation) just to send one short message. This inefficiency is complicated by peak loading conditions, when the probabilities of access request collisions are increased by the more limited idle time. Moreover, any solution to this need is further complicated by the desirability of keeping backward compatibility to earlier systems or some level of commonality with related systems like GSM and GPRS.

There remains therefore a need for an improved means for transferring shorter data communications in wireless systems that solves these and related problems.

DETAILED DESCRIPTION

These problems and others are solved by the improved method according to the invention. A presently preferred embodiment of the invention provides for a downlink message including a system parameter which indicates the system's capability for handling enhanced access bursts. Where such capability is indicated, enhanced access bursts including supplementary data in the form of varying synch sequences and/or an additional logical field may be transferred. As a result, more data can be transferred via the access burst and communications resources are conserved.

Figure 1:
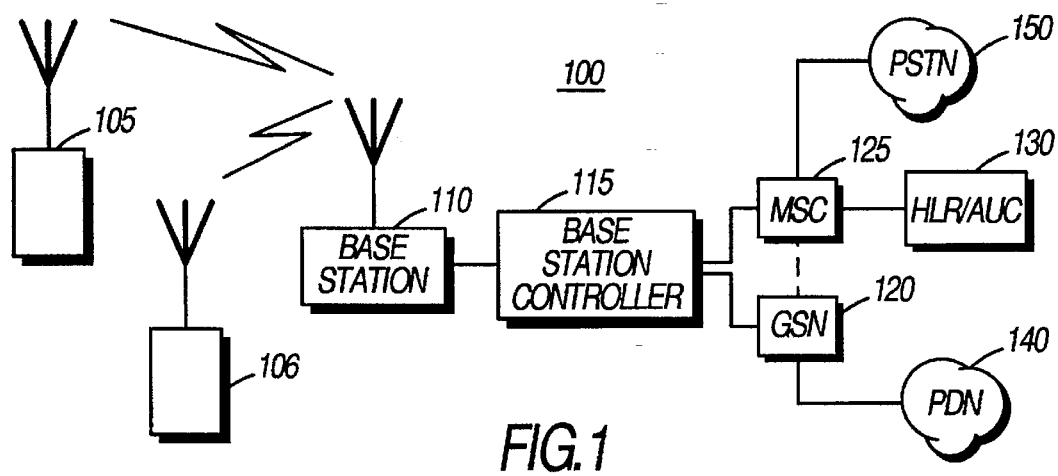
FIG. 1 is a block diagram of a wireless communications system according to one embodiment of the invention described in detail below.

Turning first to FIG. 1, a wireless communications system 100 is generally depicted having one or more subscriber units (i.e., mobile stations (MSs) 105 and 106) communicating via a base station (BS) 110 and base station controller (BSC) 115. The subscriber units may be of such diverse types as dedicated data units (e.g., personal digital assistants (PDAs)), radiotelephones including those adapted for coupling with data terminals (e.g., portable computers), or wireless adapter devices (e.g., wireless modems adapted for coupling with computers, message pads, etc.), and the like. In any event, the subscriber unit 105, 106 typically includes a transceiver and processor (not shown) appropriately programmed for wireless data communications according to a serving systems protocols. In the illustrated case a combined GPRS-GSM system is shown, although it will be recognized that the embodiments discussed herein are equally applicable to any other wireless communications system, including CDPD (cellular digital packet data), CDMA (code division multiple access), and dedicated data systems like ARDIS or RAM. In the illustrated case, the portion of the GSM system servicing voice subscribers includes an MSC (mobile switching center) 125 connected to an HLR/AuC (home location register/authentication center) 130 and PSTN (public switched telephone network) 150. The GPRS portion includes a GSN (GPRS service node) 120 connected to a packet switched PDN (public data network). GSN 120 includes all information necessary for appropriate routing of data messages; it may alternatively be coupled to MSC 125 to allow access to higher layer user information stored at a common platform such as HLR 130.

Figure 2:
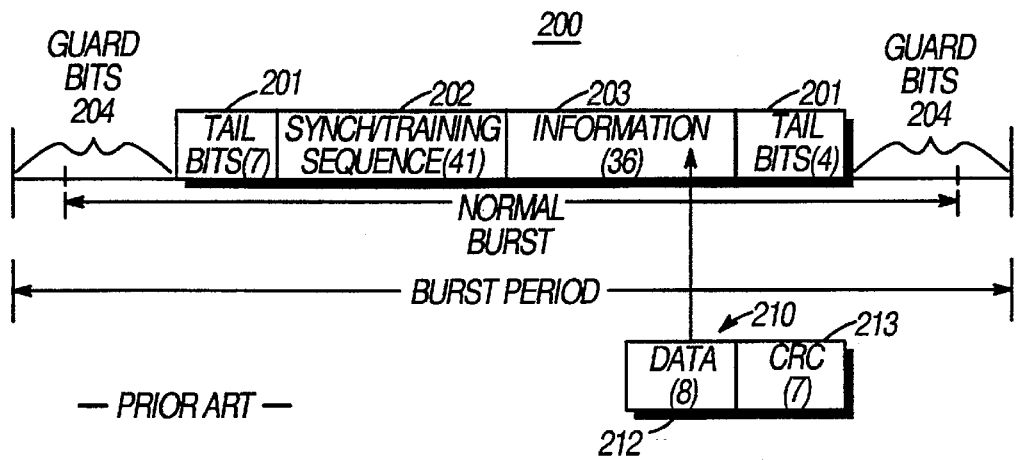
FIG. 2 is a diagram illustrating a prior art GSM access burst.
Figure 3:
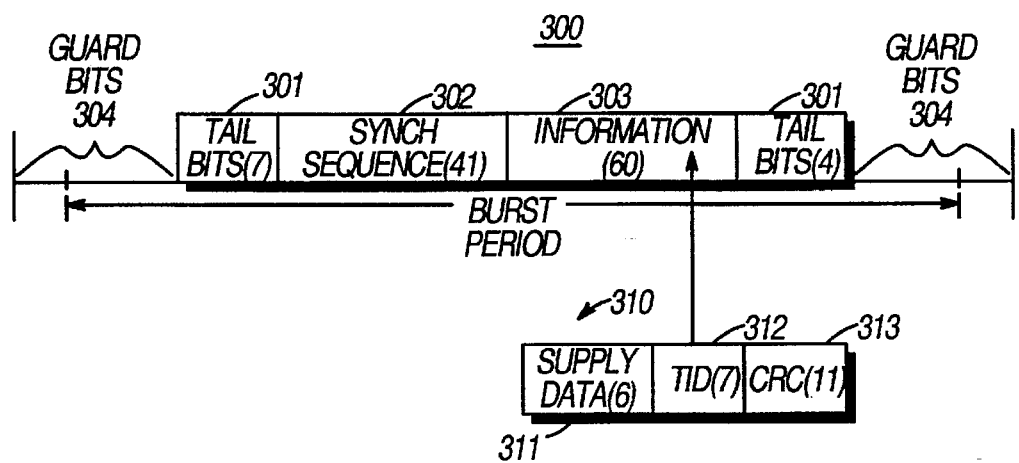
FIG. 3 is a diagram illustrating an access burst structure in accordance with the embodiment of the invention described in detail below.
Figure 4:
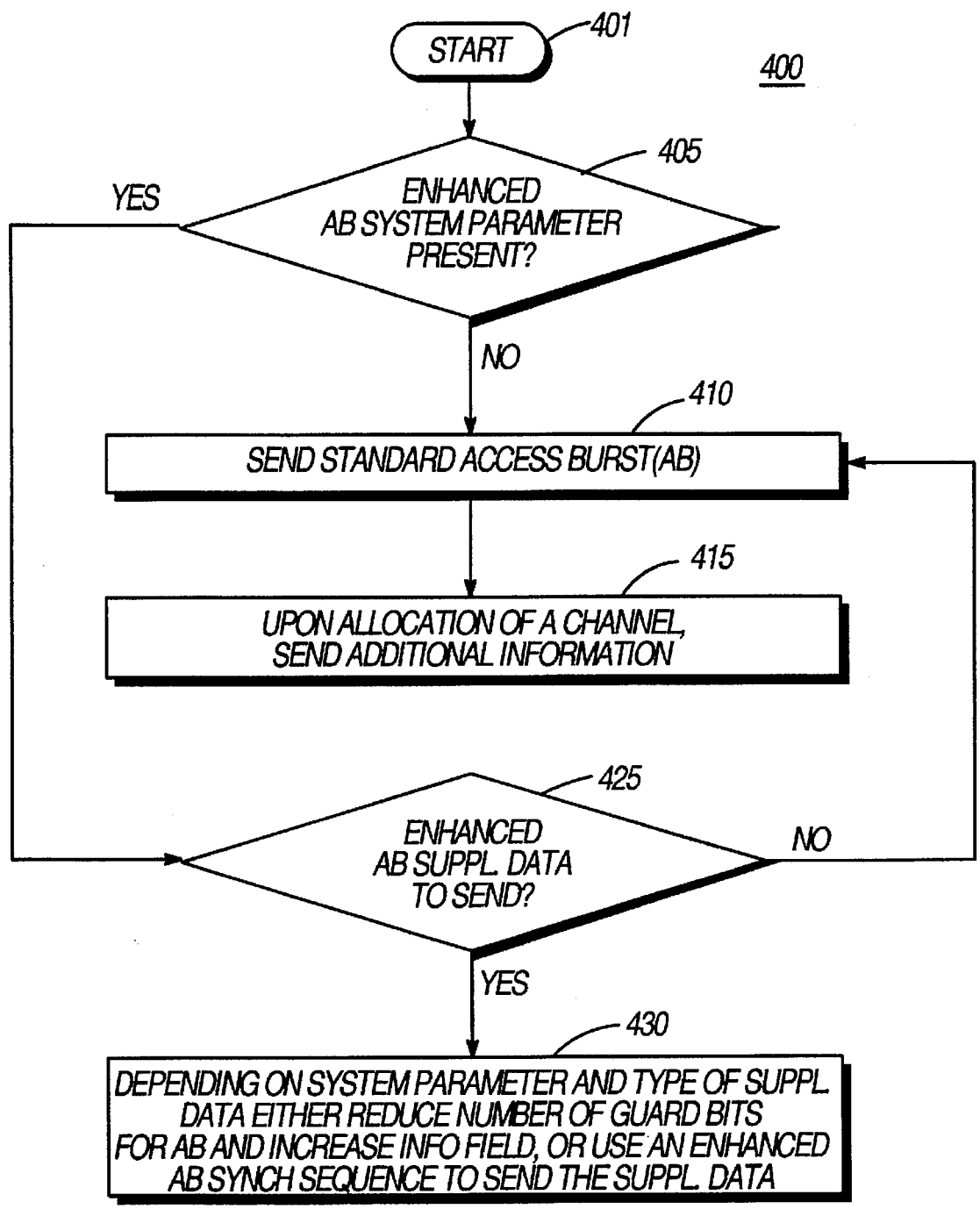
FIG. 4 is a flow chart illustrating a method for communicating with an enhanced access burst in accordance with the embodiment of the invention described in detail below.

The operation of this system can be further understood by additional reference now to FIGS. 2 through 4. FIG. 2 illustrates a prior art GSM access burst 200 structure. This access burst 200 includes tail bits 201 (11 bits in length), a training sequence 202 (41 bits in length), an information field 203 (36 bits in length), and guard bits 204 (68.25 bits in length). In contrast, a normal burst typically includes much shorter guard bits (8.25 bits in length), training sequences (26 bits) and tail bits (6 bits), thus permitting much larger information field(s) (116 bits). As mentioned above, the reasons for the shorter information field in the access burst is that it is a random access message without prior synchronization, thus requiring a longer training sequence, and because of a lack of timing synch additional guard bits are required to insure the access burst is received within a single burst period or time slot. Although potentially 36 information bits are present, after applying, for example, a rate ½ convolutional coding the uncoded access burst PDU 210 (packet data unit) may be reduced to as little as 8 data bits (212), barely enough for a (temporary identification), and 7 CRC (cyclic redundancy check) bits (213).

A major reason for the size limitation in access burst 200 is the number of guard bits required to insure reception up to 35 km (kilometers) from the sending unit. By allowing for multiple types of access bursts according to the invention, in a first embodiment the guard bits can be shortened for some locations, allowing for more information to be sent via an enhanced access burst. For example, in urban areas where most non-voice data traffic is communicated, it is rare to find cells anywhere near 35 km in size. Because of the reduced cell size, enhanced access bursts for these smaller cells can proportionally reduce the guard bit field. FIG. 3 illustrates one such enhanced access burst 300. While the tail bits 301 and synch sequence 302 are the same size as in access burst 200, the information field has been increased 24 bits to 60 bits, with a corresponding reduction in the number of guard bits to 42.25. As a result, the uncoded enhanced access burst PDU 310 can now contain an additional logical information field 311 having supplementary data to that present in standard access bursts. Such supplementary information may include, depending on design parameters, a requested quality of service (e.g., 3 bits, to distinguish up to 7 grades and a best efforts class), a request for plural subchannels in order to increase throughput rates, position data, time stamp data, ACK and NACK (acknowledgment/non-acknowledgment) signals, and many more varieties of encoded or unencoded messages.

As illustrated, where a standard logical information field such as a 7 bit TID is used in plural access burst types, field 311 has 6 supplementary data bits available for use, the remaining extra bits being used in CRC field 313. One skilled in the art will appreciate that many variations are possible on the actual structure of the enhanced access burst, depending on factors such as air interface standards, desired messaging types, and many more. What is significant is that additional information is capable of being sent compared to that of a standard access burst. In that additional information is now provided, a second "logical" field is also provided, although one should appreciate that this does not limit the range of the invention to physically distinct fields. Thus, while it is anticipated that most GPRS access burst types will keep a separate TID field, so in fact any supplementary data will form a second data field, it is also possible for the second "logical" field to be combined with the number of bits available in a standard access burst (the first "logical" information field) to form a single enhanced information field. Similarly, where the system is capable of multiplexing within a "burst" field, it is also possible for both logical information fields to serve as separate subchannels for information from multiple sources (not just from plural sending units, but e.g. from one transmitting unit but with information from two different applications or coupled end terminals multiplexed one into the first field and another into the second field).

In the preferred approach remote communication units are notified of the system capability for receiving different types of access bursts via broadcast of a system parameter. This system parameter is preferably a single or short bit field indicating that one or more known types of enhanced access bursts may be sent. Alternatively, a longer parameter could be sent indicating other information, such as the number of guard bits required or corresponding number of supplementary data bits available for use, assuming a maximum service radius for the cell is reasonably certain. The actual parameter, or the means by which the downlink message is communicated to remote units, is a matter of design choice. This or similar approaches have the benefit of allowing a remote unit send more than just a limited set of enhanced messaging, only being limited to those messages fitting within the overall number of data bits available.

In yet another embodiment the synch sequence is used to increase the messaging possible via the access burst. This advantageously permits the supplementary data to be sent/indicated by the type of synch sequence transmitted when, e.g., in larger cells, the number of guard bits cannot be significantly reduced. For example, a standard synch sequence might consist of a repeating pattern of 1010, while a synch sequence with a repeating pattern of 1100 would be indicative of a first type of supplementary information. Thus a set of synch sequences is available, each corresponding to different supplementary information/data messages. Examples of such supplementary information might include, e.g., ACK and NACK messages (thus permitting one to send a single NACK access burst, for example), requested quality of service, etc. Additionally, the supplementary information could simply be a bit value designation, e.g., with eight different synch sequences each representing a unique 3 bit value, used to communicate numeric or other recognized information (e.g., power control information, etc.).

FIG. 4 illustrates a still further embodiment, in which both of the above embodiments are capable of being employed. When data is available for transmission (step 401) the communication unit begins by determining whether an enhanced access burst parameter is present (step 405). As noted above, this parameter can be communicated via a common broadcast channel and stored upon an initial registration, or transmitted via subsequent messaging. This advantageously allows the system to alter the parameter, which might be necessary during maintenance windows or adjacent cell outages causing a temporary increase in service area size. If no enhanced system parameter is present, or the parameter only indicates standard service availability (step 405), or no supplemental data capable of transmission in an enhanced access burst is ready (step 425), a standard access burst is sent (step 410); any additional information is sent after allocation of a channel (step 415). If an enhanced system parameter is present and supplementary data can be sent, then an appropriate enhanced access burst is encoded. For example, if multiple types of supplementary data are ready, and the system parameter is indicative of a receive capability, both an increased data field (or additional logical field) and a non-standard synch sequence are preferably used. If the system capabilities did not permit such combined usage or the type of supplemental data ready is only communicable via one of these approaches, then the appropriate enhanced access burst format would be chosen and the additional information sent either through an allocated resource or subsequent access burst.

While the invention has been described in conjunction with specific embodiments thereof, it is evident that many alterations, modifications, and variations will be apparent to those skilled in the art in light of the foregoing description. For example, while the invention was illustrated in terms of a particular system, it is not limited to this illustrated cellular systems, but has broad applicability to any wireless system capable of transmitting non-voice or voice data. Thus, it should be understood that the invention is not limited by the foregoing description of preferred embodiments, but embraces all such alterations, modifications, and variations in accordance with the spirit and scope of the appended claims.

We claim:

1. A method of communicating data in a TDMA (time division multiple access) wireless communications system, comprising:

receiving a downlink message including a system parameter indicating a system capability for receiving plural types of access bursts; and in response to the downlink message, transmitting an enhanced access burst including a first logical information field containing data sent in all types of access bursts, and a second logical information field including supplementary data, wherein the system parameter is indicative of the system capability for receiving a standard access burst containing the first logical information field and having a standard number n of guard bits, and the enhanced access burst containing both the first and second logical information fields and having a reduced number m of guard bits, where m<n.

2. The method of claim 1, wherein the second logical information field has a bit size equal to n−m.

3. The method of claim 1 wherein the second logical information field contains information consisting of at least one of the group of acknowledgments, a requested quality of service, a number of subchannels requested, position data, time stamp data, and encoded messages.

4. The method of claim 1, wherein a single information unit is transmitted via the first and second logical information fields.

5. The method of claim 1, wherein the enhanced access burst includes information from a first and second end terminal, the first logical information field providing a first subchannel for first end terminal data, and the second logical information field providing a second subchannel for second end terminal data.

6. A method of communicating data in a TDMA (time division multiple access) wireless communications system, comprising:

transmitting a downlink message including a system parameter indicating a system capability for receiving, in addition to a standard access bursts containing a first logical information field, enhanced access bursts containing the first logical information field and a second logical information field not present in the standard access bursts, wherein the system parameter is indicative of the system capability for receiving, in addition to the standard access burst containing the first logical information field and having a standard number n of guard bits, the enhanced access burst containing both the first and second logical information fields and having a reduced number m of guard bits, where m<n and the second logical information field has a bit size equal to n−m.

7. A method of communicating data in a TDMA (time division multiple access) wireless communications system, comprising:

receiving a downlink message including a system parameter indicating a system capability for receiving plural types of access bursts; and in response to the downlink message, transmitting an enhanced access burst including a first logical information field including data sent in plural types of access bursts, and one of a set of synch sequences providing supplementary data, wherein the plural types of access bursts comprise a standard access burst having a standard synch sequence, and each of the set of synch sequences of the enhanced access burst provides supplementary data from at least one of the group consisting of a quality of service and a number of subchannels being requested.

8. The method of claim 7, wherein the plural types of access bursts further comprise a first access burst having a synch sequence indicative of an acknowledgment message, and a NACK access burst having a synch sequence indicative of a non-acknowledgment message.

9. The method of claim 7, wherein each of the plural types of access bursts have a different synch sequence, each of the different synch sequences representing one of plural bit values.

10. A method of communicating data in a TDMA (time division multiple access) wireless communications system, comprising:

transmitting a downlink message including a system parameter indicating a system capability for receiving plural types of access bursts each having a different synch sequence each indicative of different supplementary information, wherein the plural types of access bursts comprise a standard access burst having a standard synch sequence, and a set of enhanced access bursts each having at least one of plural different synch sequences each providing different supplementary data.

11. A method of communicating data in a TDMA (time division multiple access) wireless communications system comprising:

transmitting a downlink message including a system parameter indicating a system capability for receiving plural types of access bursts each having a different synch sequence each indicative of different supplementary information, wherein the plural types of access bursts comprise a standard access burst having a standard synch sequence, a first access burst having a synch sequence indicative of an acknowledgment message, and a NACK access burst having a synch sequence indicative of a non-acknowledgment message.

12. The method of claim 10, wherein each of the different synch sequences represents one of a set of plural bit values.

* * * * *